United States Patent [19]
Schottin

[11] Patent Number: 6,044,528
[45] Date of Patent: Apr. 4, 2000

[54] STRAP RETAINER

[76] Inventor: Thomas M. Schottin, 2336 Praire St., Ann Arbor, Mich. 48105

[21] Appl. No.: 09/263,073

[22] Filed: Mar. 8, 1999

[51] Int. Cl.[7] .............................. A44B 11/00; A44C 5/00
[52] U.S. Cl. .................................. 24/265 AL; 24/30.5 R; 24/297; 24/324; 24/666
[58] Field of Search ............................... 24/265 AL, 666, 24/701, 68 CD, 297, 324, 30.5 R; 280/33.992, 33.993; 297/484

[56] References Cited

U.S. PATENT DOCUMENTS

| | | | |
|---|---|---|---|
| 4,271,999 | 6/1981 | Stravitz | 224/257 |
| 4,324,430 | 4/1982 | Dimas, Jr. et al. | 297/250 |
| 4,420,857 | 12/1983 | Clay | 24/30.5 R |
| 4,768,704 | 9/1988 | Beckway et al. | 24/297 |
| 4,810,036 | 3/1989 | Buser | 24/265 AL |
| 4,867,464 | 9/1989 | Cook | 280/33.993 |
| 5,103,538 | 4/1992 | Ryder | 24/662 |
| 5,263,726 | 11/1993 | Wood | 280/33.992 |
| 5,423,858 | 6/1995 | Bolanos et al. | 24/297 |
| 5,566,427 | 10/1996 | Lathrop | 24/169 |
| 5,641,200 | 6/1997 | Howell | 297/256.17 |
| 5,669,118 | 9/1997 | Frano et al. | 24/265 |
| 5,706,559 | 1/1998 | Oliver et al. | 24/297 |
| 5,781,970 | 7/1998 | Anscher | 24/265 AL |

*Primary Examiner*—Victor N. Sakran
*Attorney, Agent, or Firm*—William Patrick Waters

[57] ABSTRACT

A strap retainer including a base having an integrally formed post projecting therefrom, and a post receiving member, spaced from the base wherein the post receiving member has an opening formed therein for receipt of the post. A member connects the base and the post receiving member and the post generally includes a cylindrical body portion, a generally cylindrical plug portion, each one of which has a diameter greater than the diameter of the opening in the post receiving member. The post includes a neck interposed between the body portion and the plug portion, the neck having a diameter less than the diameter of the post receiving member opening. The plug portion of the post includes a tapered end portion having a longitudinal slot formed therein for enabling deformation of the plug so that the plug portion contracts when the plug is pressed into the post receiving member opening for retention therein. The plug portion includes tapered ends which allow easy engagement of the plug opening and yet make removal therefrom difficult to achieve without a tool.

10 Claims, 1 Drawing Sheet

U.S. Patent  Apr. 4, 2000  6,044,528

STRAP RETAINER

BACKGROUND OF THE INVENTION

The present invention relates generally to strap retainers and, more particularly, to strap retainers for retention of shopping cart safety straps.

It is well known in the prior art to secure a nylon safety strap child restraint to a grocery shop cart in order to assure the safety of a child riding in the cart. It is important that such devices are securely attached to the shopping cart and it is desirable that the retainer does not become accidentally detached. In addition, the strap retainer should be resistant to damage, or removal, as a result of vandalism. This latter consideration is important because, in many cases, shopping carts are left in open parking lots for substantial periods of time thereby affording opportunities for vandalization.

Several conventional devices have been used to secure a child safety strap to a grocery cart. In general, these devices are complicated, sometimes made of metal and subject to rust, and are relatively expensive to produce. An example of a complicated device is disclosed in U.S. Pat. No. 5,669,118 in which a complicated combination of retainer elements is utilized. This device, as well as some other conventional devices, is relatively difficult to use.

Accordingly, there is a need for an efficient, low cost and effective technique for attaching a safety strap to a shopping cart.

The environment in which the device is to be used typically dictates the desirable characteristics of a suitable safety strap retainer. In a typical case, the safety strap retainer is fixed to a convenient shopping cart rail and is thereafter subject to somewhat rough usage. It is not unusual for shopping cart to be left outside, in wet weather, for long periods of time and a metal strap retainer tends to rust under these circumstances. Clearly, it would be desirable to have a strap retainer that is relatively weather resistant and able to withstand rough usage.

As another consideration, retail store employees often attach the strap retainer to the shopping cart. In this regard, it would be desirable if the retainer could be installed conveniently, without any need for a tool. In addition, a suitable strap retainer should be simple in construction and inexpensive to produce. Further, the strap retainer should be difficult to remove, after it has been installed, so that the retainer would not be susceptible to damage by vandals.

From the foregoing it will be apparent that there is a need for a strap retainer for use in securing a safety strap to a shopping cart that is mechanically simple, easy to use, low in cost and resistant to easy removal.

DISCLOSURE OF THE INVENTION

The strap retainer of the present invention is a plastic device, mechanically simple, easy to use, low in cost and resistant to ready removal. The retainer includes a base having an integrally formed post projecting therefrom, and a post receiving member, spaced from the base wherein the post receiving member has an opening formed therein for receipt of the post. A member connects the base and the post receiving member and the post generally includes a cylindrical body portion, a generally cylindrical plug portion, each one of which has a diameter greater than the diameter of the opening in the post receiving member. The post includes a neck interposed between the body portion and the plug portion, the neck having a diameter less than the diameter of the post receiving member opening. The plug portion of the post includes a tapered end portion having a longitudinal slot formed therein for enabling deformation of the plug so that the plug portion contracts when the plug is pressed into the post receiving member opening for retention therein. The plug portion includes tapered ends which allow easy engagement of the plug opening and yet make removal therefrom difficult to achieve without a tool.

In a preferred embodiment of the invention, the strap retainer is of plastic construction having a generally C-shaped body wherein the C-shaped member is deformable to permit ready attachment and engagement of the post with the post receiving opening. The retainer is simple in construction and is of one piece construction.

The post, which after installation is in intimate contact with the nylon strap, includes a series of disk shaped bulges, which provides frictional engagement of the strap, and tends to discourage slipping of the strap about the post.

A desirable aspect of the strap retainer of the present invention is that, after installation, it is difficult to remove without a tool. This is the case because the post plug portion includes shoulders that are tapered toward the center of the post and thereby provide little or no purchase to one seeking to remove the strap retainer without a specialized tool. As a result, acts of vandals in disassembling the strap retainer are discouraged.

From the foregoing, it will be apparent that the strap retainer embodying the invention is easy to install without tools, mechanically simple, economical to produce and difficult to remove without a tool.

Other aspects and advantages of the present invention will become apparent from the following detailed description, taken in conjunction with the accompanying drawings, illustrating by way of example the principles of the invention.

BEST MODE FOR CARRYING OUT THE INVENTION

Figure 1:
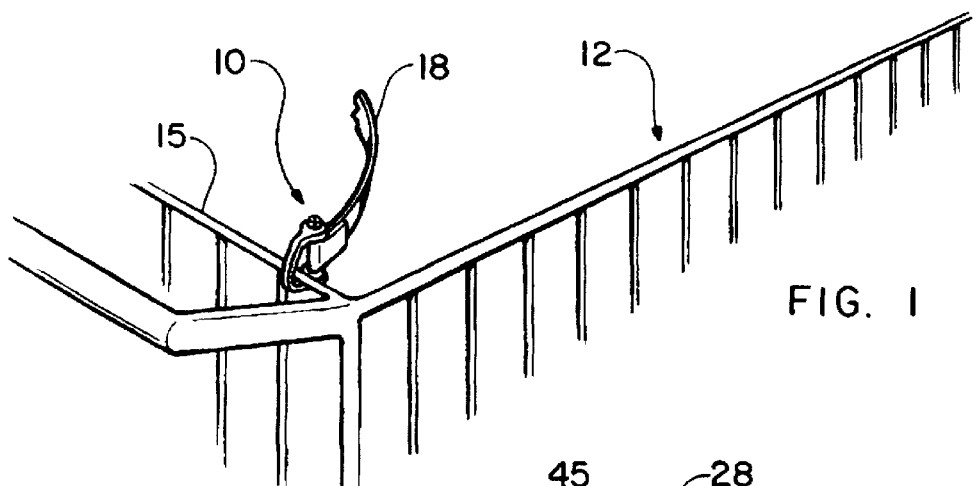
FIG. 1 is an isometric view of a strap retainer according to the present invention showing the retainer fixed to a portion of a shopping cart.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In the following detailed description and in the several figures of the drawings, like elements are identified with like reference numerals.

As shown in the drawings for purposes of illustration, the invention is embodied in a novel strap retainer 10 for securing a nylon safety strap 18 to a rail 15 of a conventional shopping cart 12.

Figure 2:
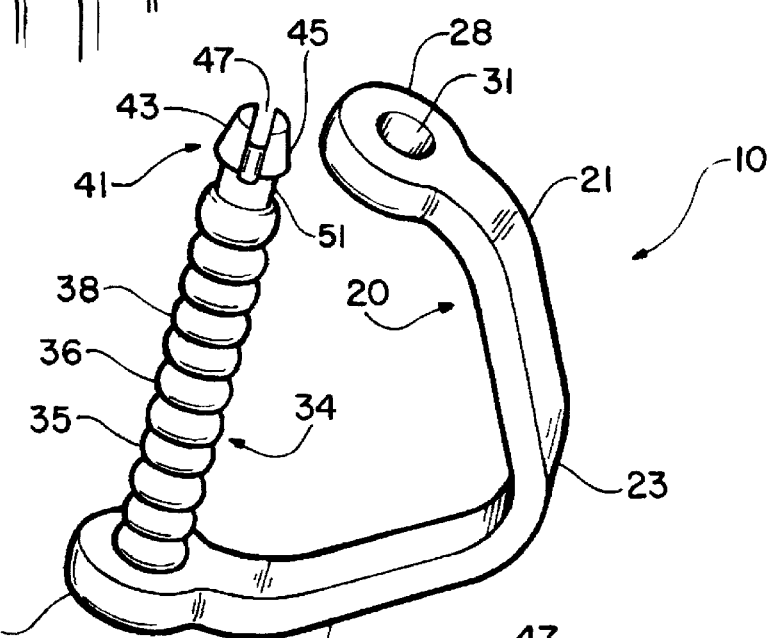
FIG. 2 is a perspective view showing the strap retainer of the present invention in an unengaged condition.
Figure 3:
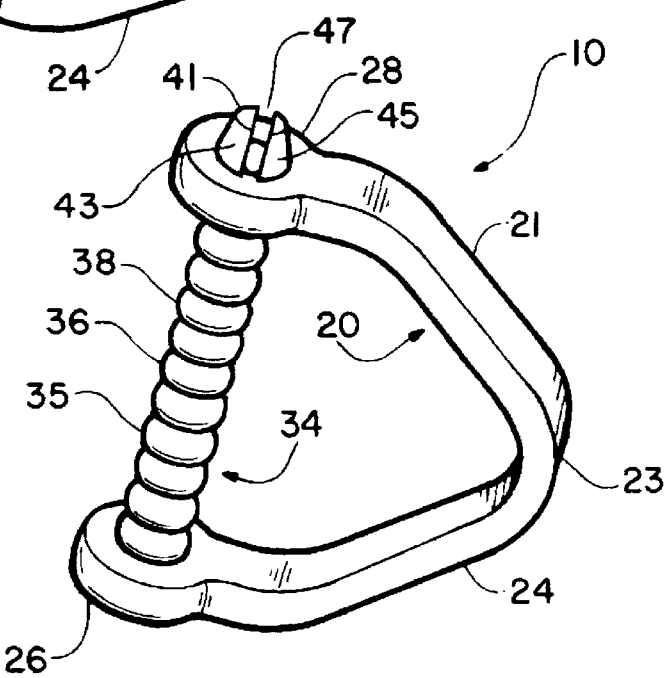
FIG. 3 is a perspective view showing the strap retainer of the present invention in an engaged condition.

In FIG. 2, the strap retainer 10 of the present invention is shown in an unengaged condition and, in FIG. 3 the strap retainer 10 is shown in an engaged condition. The strap retainer 10 includes a base 26 having an integrally formed post 34 projecting therefrom. A post receiving member 28 spaced from the base 26 has formed therein a post receiving member opening 31. The base 26 and the post receiving member 28 are connected by a resilient C-shaped member 20 which includes leg members 21 and 24 connected at a bulge 23. It will be noted that the bulge 23 has a radius of curvature that enables it to conform generally to the rail 15 of a conventional shopping cart.

The post 34 is comprised of a body portion 38 which is generally cylindrical, a generally cylindrical plug portion 41 and, a neck 51 which is interposed between the body portion 38 and the plug portion 41. The post body portion 38 is comprised of a plurality of ring shaped elements 35 and 36 which afford means of purchase of the safety strap 18 which, as a result of frictional engagement with the safety strap 18, tends to dampen any rotation of the safety strap about the post 34.

During installation of the strap retainer 10, to achieve the condition shown in FIG. 3, the plug portion 41 is inserted forcibly into the opening post receiving member opening 31. In this regard, the plug portion 41 and the post 34 each have a diameter greater than the diameter of the post receiving member opening 31 while the neck 51 has a diameter less than the diameter of the opening. The plug portion 41 includes an opposed pair of wedged shaped elements 43 and 45 separated by an axial slot 47. The presence of the axial slot 47, which extends the length of the plug portion 41, permits compression of the elements 43 and 45 together as the plug portion 41 is forced through the post receiving member opening 31. Of course, once the plug portion 41 has passed through the plug receiving member opening 31 and the neck 51 is engaged within the opening 31, the elements 43 and 45 snap back to their original condition thereby securing the post 34 in the post receiving member opening 31.

It will be noted, with reference to FIG. 3 that, after the post 34 is urged into engagement with the post receiving member 28, only the tapered elements 43 and 45 project beyond the plug receiving member opening 31. Because these elements are tapered towards the center, it is difficult for one to compress them sufficiently to force the plug portion 41 out of engagement with the post receiving member 28. A tool (not shown), is required in order to compress the elements 43 and 45 sufficiently to separate the post 34 from the post receiving member 28. As a result, acts of vandalism in removing the strap retainer 10 from a shopping cart are substantially eliminated.

From the foregoing it will be appreciated that the strap retainer provided by the invention provides an efficient technique for attaching safety straps to shopping carts. The device is mechanically simple, easy to use and low in cost.

It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. A strap retainer comprising:
   a base, said base including an integrally formed post projecting therefrom;
   a post receiving member, spaced from said base, said post receiving member having an opening formed therein;
   a member connecting said base and said post receiving member, said post including a generally cylindrical body portion and a generally cylindrical plug portion, each one of said body portion and said plug portion having a diameter greater than the diameter of said post receiving member opening, said post further including a neck interposed between said body and portion and said plug portion, said neck having a diameter less than the diameter of said post receiving member opening, wherein said plug portion includes a tapered end portion, said plug portion having formed therein a single axial slot wherein said axial slot divides said tapered end portion into a pair of wedge shaped elements, said axial slot enabling said wedge shaped elements to move toward one another when said plug portion is pressed into said post receiving member opening for retention therewithin.

2. The strap retainer according to claim 1, said base being generally disk like in configuration.

3. The strap retainer according to claim 1, wherein said post receiving member is generally disk like in configuration.

4. The strap retainer according to claim 1, wherein said connecting member is a pliable C-shaped element having a first member and a second member joined at an outwardly bulging portion.

5. The strap retainer according to claim 4, wherein said pliable C-shaped element is of plastic construction.

6. The strap retainer according to claim 1, wherein said post includes means for engaging a strap frictionally.

7. The strap retainer according to claim 6, wherein said engaging means includes a plurality of stacked discs.

8. The strap retainer according to claim 1, wherein said plug portion includes a pair of opposed tapered elements.

9. The strap retainer according to claim 1, wherein said axial slot extends throughout said plug portion.

10. The strap retainer according to claim 1, wherein said strap retainer includes means resiliently separating said post receiving member from said post.

* * * * *